United States Patent
Lee et al.

(10) Patent No.: US 9,835,787 B2
(45) Date of Patent: Dec. 5, 2017

(54) LIGHT GUIDE PLATE, BACKLIGHT UNIT AND LIQUID CRYSTAL DISPLAY DEVICE USING THE SAME

(71) Applicant: LG Display Co., Ltd., Seoul (KR)

(72) Inventors: SangHyun Lee, Gyeonggi-do (KR); JaeJung Han, Seoul (KR); YongJoong Yoon, Gyeonggi-do (KR); Hyosung Lee, Chungcheongbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/275,703

(22) Filed: Sep. 26, 2016

(65) Prior Publication Data

US 2017/0090099 A1    Mar. 30, 2017

(30) Foreign Application Priority Data

Sep. 30, 2015    (KR) .................. 10-2015-0137675

(51) Int. Cl.
*F21V 8/00*    (2006.01)

(52) U.S. Cl.
CPC ......... *G02B 6/0043* (2013.01); *G02B 6/0021* (2013.01); *G02B 6/0061* (2013.01); *G02B 6/0068* (2013.01)

(58) Field of Classification Search
CPC .. G02B 6/0043; G02B 6/0061; G02B 6/0021; G02B 6/0068; G02B 6/0001; G02B 6/0011; G02B 6/0013; G02B 6/0015; G02B 6/0016; G02B 6/0018; G02B 6/002; G02B 6/003

See application file for complete search history.

(56) References Cited

U.S. PATENT DOCUMENTS

| | | | | |
|---|---|---|---|---|
| 9,690,034 | B2* | 6/2017 | Umekawa | G02B 6/0038 |
| 2006/0082884 | A1* | 4/2006 | Feng | G02B 5/1814 |
| | | | | 359/569 |
| 2006/0291183 | A1* | 12/2006 | Nishiyama | G05G 1/105 |
| | | | | 362/23.15 |
| 2007/0103936 | A1* | 5/2007 | Yue | G02B 6/0016 |
| | | | | 362/613 |
| 2012/0140519 | A1* | 6/2012 | Sakai | G02B 6/0016 |
| | | | | 362/608 |
| 2012/0307519 | A1* | 12/2012 | Sakai | G02B 6/0016 |
| | | | | 362/602 |

* cited by examiner

*Primary Examiner* — Joseph L Williams
*Assistant Examiner* — Jose M Diaz
(74) *Attorney, Agent, or Firm* — Morgan, Lewis & Bockius LLP

(57) ABSTRACT

A light guide plate includes a main body having a light receiving edge and an opposite side, the opposite side being opposite from the light receiving edge; at least one variant portion having a protruded portion that protrudes from the main body from the opposite side, the at least one variant portion defining a hole vertically passing through the main body; and an optical pattern provided in the at least one variant portion.

14 Claims, 9 Drawing Sheets

LIGHT GUIDE PLATE, BACKLIGHT UNIT AND LIQUID CRYSTAL DISPLAY DEVICE USING THE SAME

CROSS REFERENCE TO RELATED APPLICATIONS

This application claims the benefit of Korean Patent Application No. 10-2015-0137675 filed on Sep. 30, 2015, which is hereby incorporated by reference for all purposes as if fully set forth herein.

BACKGROUND OF THE INVENTION

Field of the Invention

The present invention relates to a light guide plate, and a backlight unit and a liquid crystal display device including the same.

Discussion of the Related Art

A general liquid crystal display device is a light switching device, and displays an image using thin film transistors. In addition to being used as a display for televisions and computer monitors, the liquid crystal display device is widely used as a display for devices, such as notebook computers, tablet computers, smart phones, portable display devices, and portable information devices. Because the liquid crystal display device is not a self-emitting device, the liquid crystal display device displays an image using light irradiated from a backlight unit arranged below a liquid crystal display panel.

FIG. 1 is a cross-sectional view illustrating a general backlight unit. In FIG. 1, the general backlight unit includes a light guide plate 10 having a light incident portion 12, and a light emitting diode array 20. The light guide plate 10 has a rectangular shape. Here, the light guide plate 10 upwardly emits light incident from the light emitting diode array 20 onto the light incident portion 12, which is flat and provided at one side, and then internally refracts and reflects the light. Specifically, the light emitting diode array 20 is arranged at one side of the light guide plate 10 to face the light incident portion 12 of the light guide plate 10. The light emitting diode array 20 includes a plurality of light emitting diode packages 22 arranged at certain intervals. Each of the plurality of light emitting diode packages 22 irradiates light to the light incident portion 12 of the light guide plate 10 by emitting the light through a light emission surface facing the light incident portion 12 of the light guide plate 10.

Because the general backlight unit includes the light guide plate 10 having a shape restricted to a rectangular shape, light may uniformly be diffused to reach an opposite surface of the light incident portion 12 of the light guide plate 10. However, if the liquid crystal display device, the backlight unit, and the light guide plate are modified to various shapes for application to various products, light may fail to reach a specific area of the light guide plate, thereby resulting in a dark portion. For this reason, a problem may occur in that a luminance of the specific area of the light guide plate is reduced, thereby causing a deterioration in picture quality.

SUMMARY

Accordingly, the present invention is directed to a light guide plate, a backlight unit, and a liquid crystal display device including the same, which substantially obviate one or more problems due to limitations and disadvantages of the related art.

An object of the present invention is to provide a light guide plate, and a backlight unit, and a liquid crystal display device including the same in which dark portions are avoided.

Additional features and advantages of the invention will be set forth in the description that follows, and in part will become apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a light guide plate comprises a main body having a light receiving edge and an opposite side, the opposite side being opposite from the light receiving edge; at least one variant portion having a protruded portion that protrudes from the main body from the opposite side, the at least one variant portion defining a hole vertically passing through the main body; and an optical pattern provided in the at least one variant portion.

In another aspect, a backlight unit comprises a light guide plate, the light guide plate including a main body having a light receiving edge and an opposite side, the opposite side being opposite from the light receiving edge, at least one variant portion having a protruded portion that protrudes from the main body from the opposite side, the at least one variant portion defining a hole vertically passing through the main body, and an optical pattern provided in the at least one variant portion; and a light emitting diode array arranged at a side of the light guide plate to face the light receiving edge.

In another aspect, a liquid crystal display device comprises a backlight unit; and a liquid crystal panel on the backlight unit, wherein the backlight unit includes: a light guide plate having a main body with a light receiving edge and an opposite side such that the opposite side being opposite from the light receiving edge, at least one variant portion having a protruded portion that protrudes from the main body from the opposite side such that the at least one variant portion defines a hole vertically passing through the main body, and an optical pattern provided in the at least one variant portion; and a light emitting diode array arranged at a side of the light guide plate to face the light receiving edge.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a light guide plate, a backlight unit and a liquid crystal display device, which include the same, according to embodiments the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
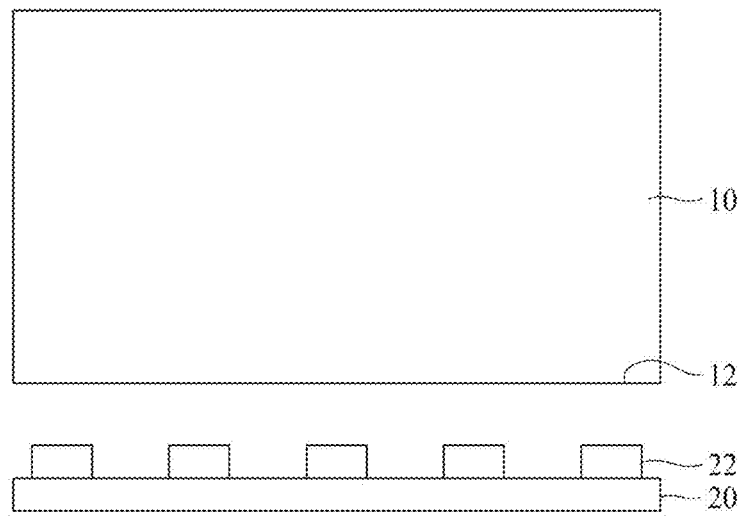
FIG. 1 is a cross-sectional view illustrating a general backlight unit.
Figure 2:
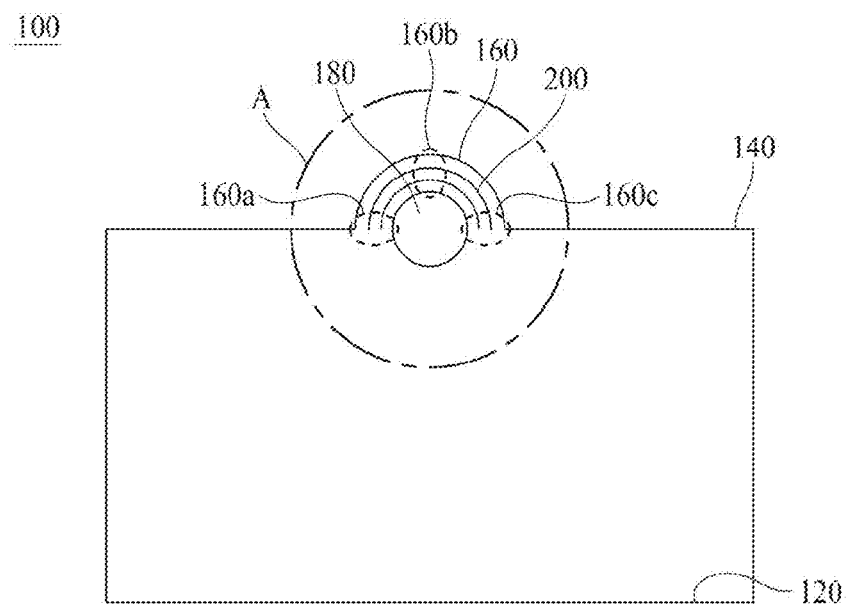
FIG. 2 is a plane view illustrating a light guide plate according to a first example embodiment of the present invention.
Figure 3:
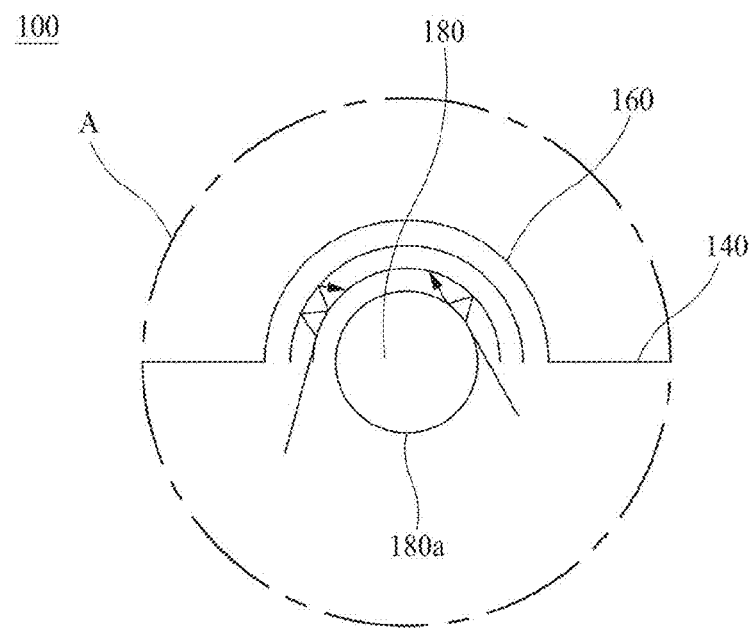
FIG. 3 is an enlarged view illustrating an area A of FIG. 2.

FIG. 2 is a plane view illustrating a light guide plate according to a first example embodiment of the present invention, and FIG. 3 is an enlarged view illustrating an area A of FIG. 2.

With reference to FIGS. 2 and 3, the light guide plate 100 according to the first embodiment of the present invention comprises a main body including a light incident portion (light receiving edge) 120, an opposite portion (opposite side) 140 that is on a side opposing the light incident portion 120, a hollow portion (or hole) 180, and a variant portion 160 having an optical pattern 200.

The light incident portion 120 corresponds to one side of the light guide plate 100, and is a surface where light emitted from a light emitting diode array (not shown) enters. The light incident portion 120 allows light from the light emitting diode array (not shown) to enter the light guide plate 100, and the light guide plate 100 upwardly emits light incident from the light emitting diode array (not shown) by internally refracting and reflecting the light.

The opposite portion 140 of the light incident portion corresponds to the other side of the light guide plate 100 that is at an opposite side of the light guide plate 100 from the light incident portion 120. The opposite portion 140 of the light incident portion may be parallel with the light incident portion 120. However, the present invention is not limited to such a configuration. For example, the opposite portion 140 may alternatively be formed inclined relative to the light incident portion 120.

The variant portion 160 is arranged on the opposite portion 140 of the light incident portion. In the illustrated example, the variant portion 160 has a semi-circular shape and is protruded from the opposite portion 140. The variant portion 160 includes introduction portions 160a and 160c and a center portion 160b.

The introduction portions 160a and 160c are boundary portions between the variant portion 160 and the opposite portion 140. Further, the introduction portions 160a and 160c are light inlets to the variant portion 160, and are provided at both sides of the hollow portion 180.

The center portion 160b is a center portion of the variant portion 160, and is an area where light incident from the light incident portion 120 is covered by the hollow portion 180.

The hollow portion 180 is a hole provided at the center portion of the variant portion 160 to have a certain width. At this time, the hollow portion 180 vertically passes through the main body, and has a concentric circle shape with the variant portion 160. The hollow portion 180 includes a front portion 180a. Alternatively, the hollow portion 180 may be formed as an oval or polygonal hole instead of a circular hole.

The front portion 180a is an area where the hollow portion 180 faces the light incident portion 120. The front portion 180a prevents light incident from the light incident portion 120 from reaching the center portion 160b of the variant portion 160, and luminance of the center portion 160b may be consequently deteriorated, thereby causing a dark portion. Therefore, the light guide plate 100 according to the first embodiment of the present invention includes the optical pattern 200 in the variant portion 160.

The optical pattern 200 is arranged on the variant portion 160. In the illustrated case, at least one or more of the optical patterns 200 are arranged on the variant portion 160. In more detail, the optical pattern 200 is formed along the shape of the variant portion 160 from the introduction portion 160a at one side to reach the introduction portion 160c at the other side through the center portion 160b. That is, the optical pattern 200 is provided between the hollow portion 180 and an outer side of the variant portion 160 to have a semi-circle shape. The optical pattern 200 reflects light incident from the light incident portion 120 to reach the center portion 160b of the variant portion 160. In more detail, the optical pattern 200 guides light, which enters the introduction portions 160a and 160c of the variant portion 160 from the light incident portion 120, along its shape and reflects the light to reach the center portion 160b, which would otherwise be covered from the light incident portion 120 by the hollow portion 180. At this time, the optical pattern 200 is a convex lens, and may be formed in various shapes, such as a trigonal prism or a rounded prism.

Therefore, in the light guide plate 100 according to the first embodiment of the present invention, the optical pattern 200 is formed at the variant portion 160, thereby preventing a dark portion caused by light failing to reach a specific area of the light guide plate 100. Therefore, when the light guide plate 100 is applied to the backlight unit and the liquid crystal display device, picture quality deterioration can be avoided.

Figure 4:
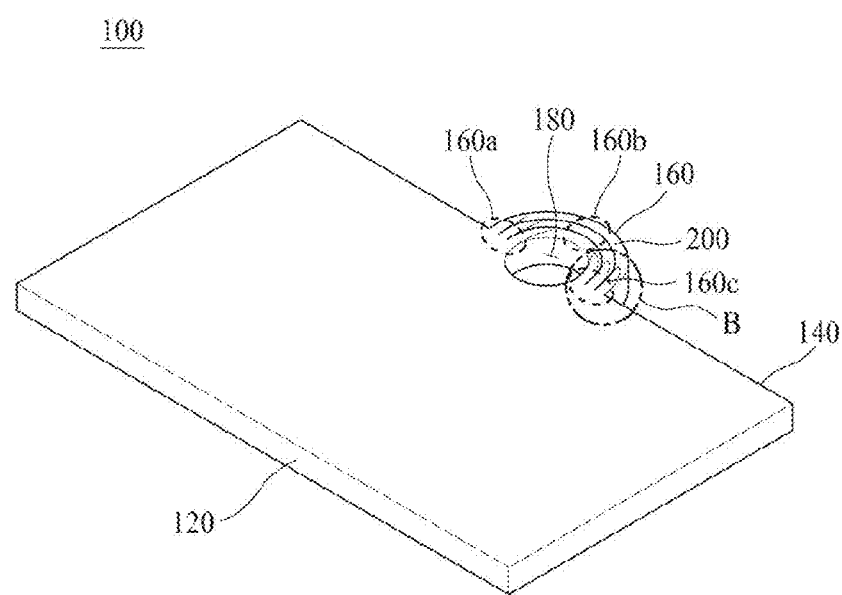
FIG. 4 is a perspective view illustrating a light guide plate according to a second example embodiment of the present invention.
Figure 5:
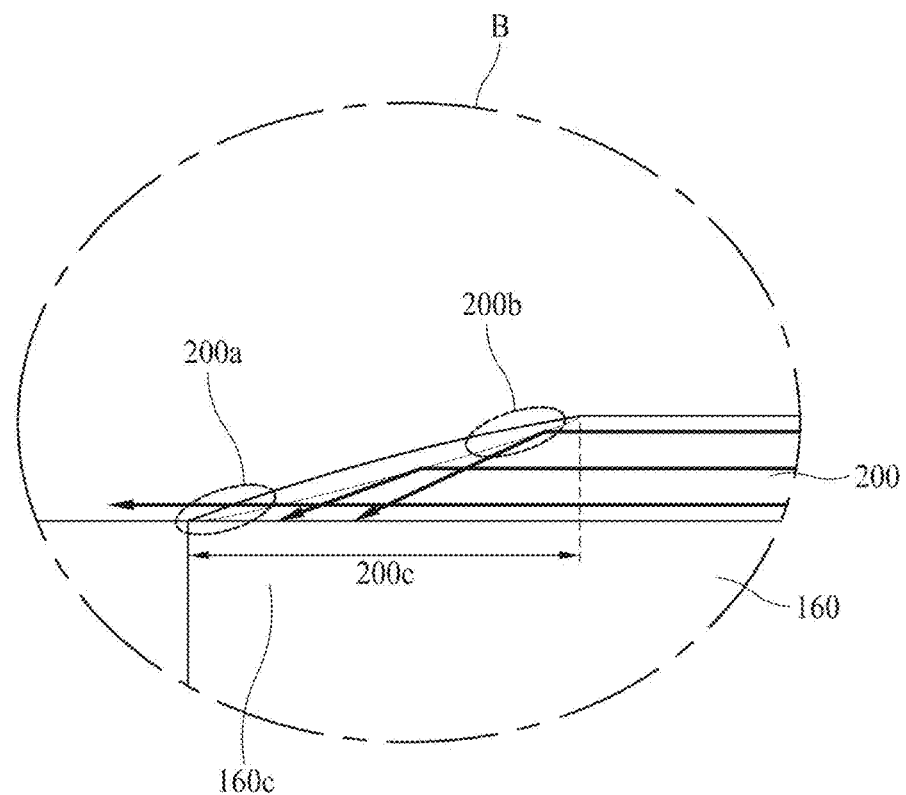
FIG. 5 is an enlarged view illustrating an area B of FIG. 4.

FIG. 4 is a perspective view illustrating a light guide plate according to a second example embodiment of the present invention, FIG. 5 is an enlarged view illustrating an area B of FIG. 4. In FIGS. 4 and 5, the structure of the optical pattern of the light guide plate according to the first embodiment shown in FIGS. 2 and 3 is modified. Therefore, only the optical pattern will be described hereinafter, and repeated description of the same elements as those of the first embodiment will be omitted.

With reference to FIGS. 4 and 5, the optical pattern 200 is formed along the shape of the variant portion 160 from the introduction portion 160a at one side to the introduction portion 160c at the other side through the center portion 160b. The optical pattern 200 reflects light incident from the light incident portion 120 to reach the center portion 160b of the variant portion 160. At this time, because the optical pattern 200 is formed from the introduction portions 160a and 160c of the variant portion 160, a luminance difference may occur between the optical pattern 200 and a portion of the light guide plate 100 where the optical pattern 200 is not formed. Therefore, the optical pattern 200 of the light guide plate 100 according to the second example embodiment of the present invention includes inclined surfaces provided at both edge portions based on a length direction. That is, the optical pattern 200 forms a distance difference 200c of an area where light enters, by varying a height of an area overlapped with the introduction portions 160a and 160c of the variant portion 160. The optical pattern 200 includes a lower light emission surface 200a and an upper light emission surface 200b.

The lower and upper light emission surfaces 200a and 200b correspond to boundary surfaces where light is emitted from the light incident portion 120 to the optical pattern 200. At this time, the lower light emission surface 200a is a lower boundary surface of the optical pattern 200, and the upper light emission surface 200b is an upper boundary surface of the optical pattern 200.

The lower light emission surface 200a is arranged at the introduction portion 160c at one side of the variant portion 160 and emits light incident from the introduction portion 160a at the other side of the variant portion 160.

The upper light emission surface 200b is arranged to be spaced apart from the introduction portions 160a and 160c of the variant portion 160 as much as the distance difference 200c. The upper light emission surface 200b downwardly reflects the light incident from the introduction portion 160a at the other side and, then, emits the light to the introduction portion 160c at one side.

As described above, in the light guide plate 100 according to the second example embodiment of the present invention, a luminance difference between the portion of the light guide plate 100 where the optical pattern 200 is not formed and the introduction portions 160a and 160c of the variant portion 160 is not significantly caused by the distance difference 200c between the area where the light enters the lower light emission surface 200a and the area where the light enters the upper light emission surface 200b. Also, as the optical pattern 200 of the light guide plate 100 according to the second example embodiment of the present invention includes inclined surfaces provided at both edge portions based on a length direction, light emitted to the upper light emission surface 200b of the optical pattern 200 is reflected downwardly, whereby flashing light is avoided. In the light guide plate 100 according to the second example embodiment of the present invention, the optical pattern 200 is formed at the variant portion 160, whereby the problem that the dark portion caused as light fails to reach a specific area of the light guide plate 100 may be solved. Therefore, when the light guide plate 100 is applied to the backlight unit and the liquid crystal display device, a problem that picture quality is deteriorated may be solved.

Figure 6:
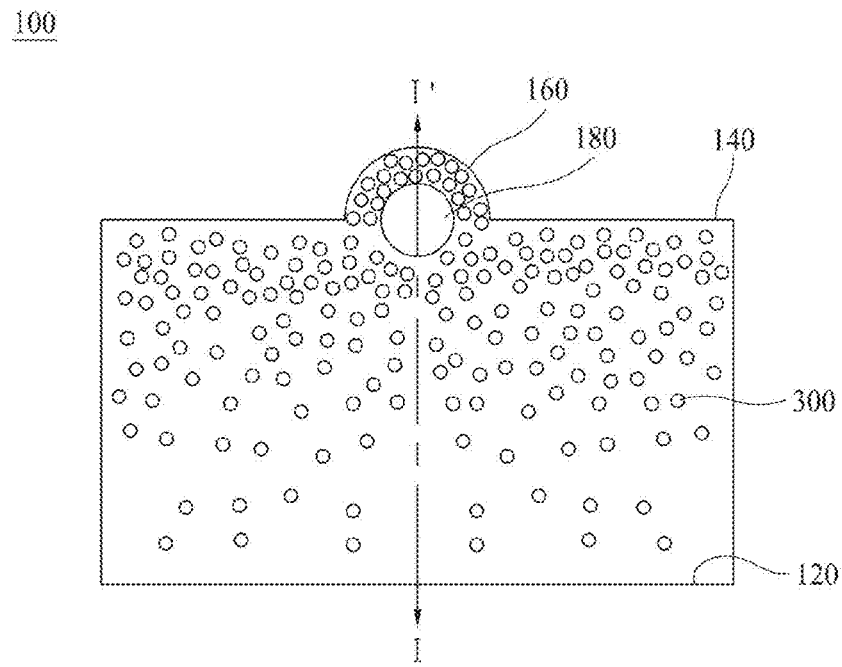
FIG. 6 is a plane view illustrating a light guide plate according to a third example embodiment of the present invention.
Figure 7:
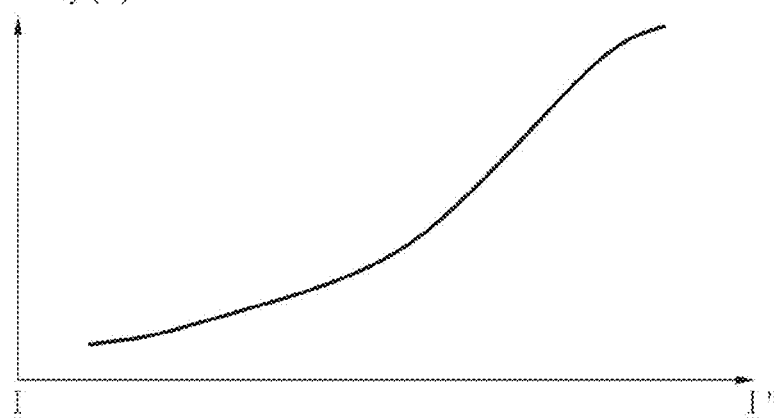
FIG. 7 is a graph illustrating density of a rear optical pattern of a light guide plate shown in FIG. 6.

FIG. 6 is a plane view illustrating a light guide plate according to a third example embodiment of the present invention, and FIG. 7 is a graph illustrating density of a rear optical pattern of a light guide plate shown in FIG. 6. In FIGS. 6 and 7, a rear optical pattern is formed on a rear surface of the light guide plate according to the first example embodiment shown in FIGS. 2 and 3. Therefore, only the rear optical pattern will be described hereinafter, and repeated description of the same elements as those of the first example embodiment will be omitted.

As shown in FIG. 6, the rear optical pattern 300 is arranged on a rear surface of the light guide plate 100. The rear optical pattern 300 emits light to a front surface of the light guide plate 100 by changing an advancing angle of light that enters the inside of the light guide plate 100 from the light incident portion 120. At this time, the rear optical pattern 300 may be, but is not limited to, a dot pattern, for example. Various patterns may be applied to the rear optical pattern 300.

Meanwhile, the light guide plate 100 is provided with the variant portion 160 formed at one side of the opposite portion 140 of the light incident portion, and light incident from the light incident portion 120 fails to reach the variant portion 160 due to the hollow portion 180 provided in the variant portion 160. Therefore, the light guide plate 100 according to the third example embodiment of the present invention is provided with the rear optical pattern 300 formed on the rear surface, wherein the rear optical pattern 300 has density 'v' that increases with distance from the light incident portion 120. That is, the rear optical pattern 300 is formed by gradually increasing the density 'v' over the entire rear surface of the light guide plate 100 from the light incident portion 120 to the opposite portion 140 of the light incident portion. Particularly, the rear optical pattern 300 is formed with a high density 'v' at the variant portion 160 where it is difficult for light to reach so that light entering the variant portion 160 where a dark portion may otherwise occur will be more readily emitted. Therefore, the light guide plate 100 according to the third example embodiment of the present invention may prevent a luminance difference per area from occurring, and may prevent a dark portion caused as light fails to reach a specific area from occurring. Therefore, when the light guide plate 100 is applied to the backlight unit and the liquid crystal display device, a problem that picture quality is deteriorated may be solved.

Figure 8:
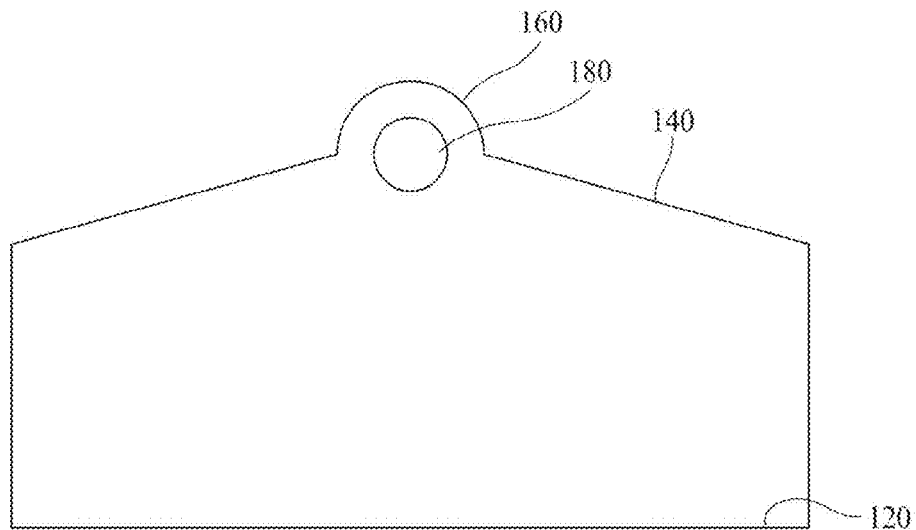
FIG. 8 is a plane view illustrating a light guide plate according to a fourth example embodiment of the present invention.

FIG. 8 is a plane view illustrating a light guide plate according to a fourth example embodiment of the present invention. In FIG. 8, the structure of the half-light incident portion of the light guide plate according to the first example embodiment shown in FIGS. 2 and 3 is modified. Therefore, only the half-light incident portion will be described hereinafter, and a repeated description of the same elements as those of the first example embodiment will be omitted.

In FIG. 8, the opposite portion 140 includes inclined surfaces inclined from both sides of the variant portion 160. That is, the opposite portion 140 is formed to be inclined towards both sides based on the variant portion 160 without being parallel with the light-incident portion 120. Therefore, the opposite portion 140 is inclined from the sides of the light guide plate 100 to the center such that an area of the light guide plate 100 becomes wide. As the opposite portion 140 is inclined from the sides of the light guide plate 100 to the center such that the area of the light guide plate 100 becomes wide, light incident from the light incident portion 120 may be reflected toward the variant portion 160.

Therefore, in the light guide plate 100 according to the fourth example embodiment of the present invention, the opposite portion 140 is formed to be inclined, whereby the problem of the dark portion caused as light fails to reach a specific area of the light guide plate 100 may be solved. Therefore, when the light guide plate 100 is applied to the backlight unit and the liquid crystal display device, a problem that picture quality is deteriorated may be solved.

Figure 9:
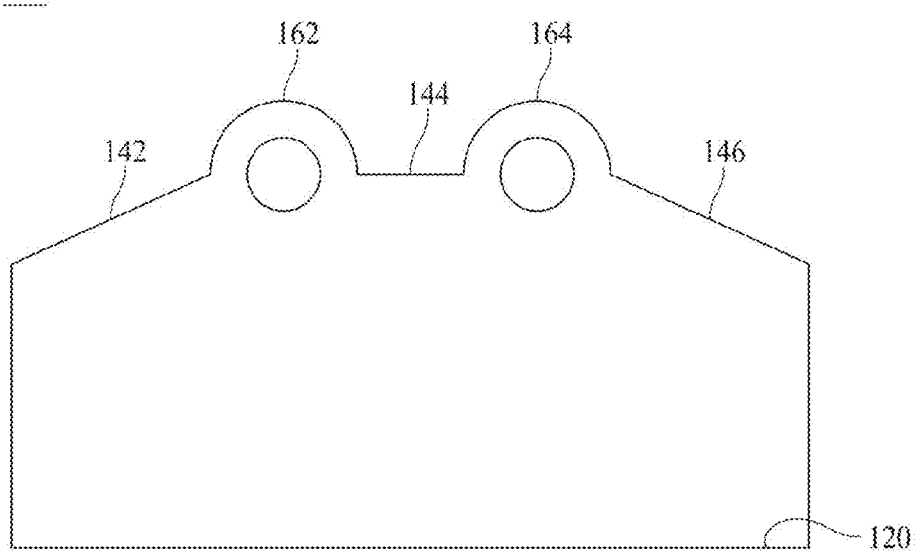
FIG. 9 is a plane view illustrating a light guide plate according to a fifth example embodiment of the present invention.

FIG. 9 is a plane view illustrating a light guide plate according to a fifth example embodiment of the present invention. In FIG. 9, an additional variant portion is provided in the light guide plate according to the first example embodiment shown in FIGS. 2 and 3, and the structure of the opposite portion is modified. Therefore, only the variant portion and the opposite portion will be described hereinafter, and a repeated description of the same elements as those of the first example embodiment will be omitted.

With reference to FIG. 9, the variant portion includes a first variant portion 162 and a second variant portion 164, and the opposite portion includes a plurality of half-light incident portions (edge segments). In FIG. 9, the opposite portion includes a first half-light incident portion 142, a second half-light incident portion 144, and a third half-light incident portion 146. The first half-light incident portion 142 is arranged at one side of the first variant portion 162 and is formed to be inclined. The second half-light incident portion 144 is arranged between the first variant portion 162 and the second variant portion 164. The third half-light incident portion 146 is arranged at one side of the second variant portion 164 and is formed to be inclined.

The first and third half-light incident portions 142 and 146 are inclined from the sides of the light guide plate 100 to the center such that the area of the light guide plate 100 becomes wide. As the first and third half-light incident portions 142 and 146 of the light incident portion are inclined from the sides of the light guide plate 100 to the light incident portion 120 such that the area of the light guide plate 100 becomes wide, light incident from the light incident portion 120 may be reflected toward the variant portion 160.

Therefore, in the light guide plate 100 according to the fifth example embodiment of the present invention, the opposite portion (i.e., the first to third half-light incident portions 142, 144, and 146) is formed to be inclined so that the problem of the dark portion caused by light failing to reach a specific area of the light guide plate 100 may be solved. Therefore, when the light guide plate 100 is applied to the backlight unit and the liquid crystal display device, a problem that picture quality is deteriorated may be solved.

Figure 10:
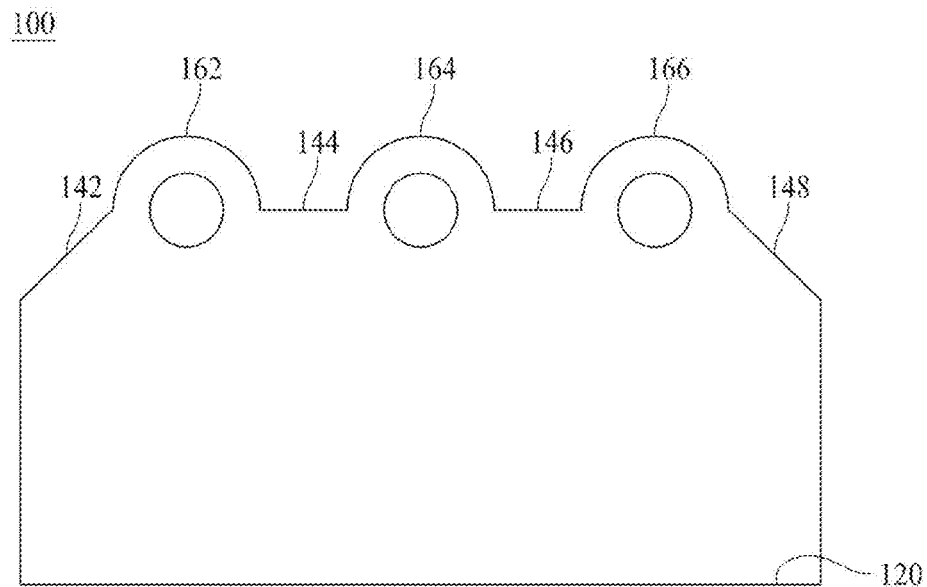
FIG. 10 is a plane view illustrating a light guide plate according to a sixth example embodiment of the present invention.

FIG. 10 is a plane view illustrating a light guide plate according to a sixth example embodiment of the present invention. In FIG. 10, the variant portion is additionally provided in the light guide plate according to the first example embodiment shown in FIGS. 2 and 3, and the structure of the half-light incident portion is modified. Therefore, only the variant portion and the half-light incident portion will be described hereinafter, and repeated description of the same elements as those of the first example embodiment will be omitted.

As shown in FIG. 10, the variant portion includes a first variant portion 162, a second variant portion 164, and a third variant portion 166. Further, the opposite portion a first half-light incident portion 142, a second half-light incident portion 144, a third half-light incident portion 146, and a fourth half-light incident portion 148. The first half-light incident portion 142 is arranged at one side of the first variant portion 162 and is formed to be inclined. The second half-light incident portion 144 is arranged between the first variant portion 162 and the second variant portion 164. The third half-light incident portion 146 is arranged between the second variant portion 164 and the third variant portion 166. The fourth half-light incident portion 148 is arranged at one side of the third variant portion 166 and is formed to be inclined.

The first and fourth half-light incident portions 142 and 148 are inclined from the sides of the light guide plate 100 to the center such that the area of the light guide plate 100 becomes wide. Because the opposite portion (i.e., first and fourth half-light incident portions 142, 144, 146, and 148) is inclined from the sides of the light guide plate 100 to the light incident portion 120 such that the area of the light guide plate 100 becomes wide, light incident from the light incident portion 120 may be reflected toward the variant portions 162, 164, and 166.

Therefore, in the light guide plate 100 according to the sixth example embodiment of the present invention, the opposite portion is formed to be inclined so that the problem of the dark portion caused by light failing to reach a specific area of the light guide plate 100 may be solved. Therefore, when the light guide plate 100 is applied to the backlight unit and the liquid crystal display device, a problem that picture quality is deteriorated may be solved.

Figure 11:
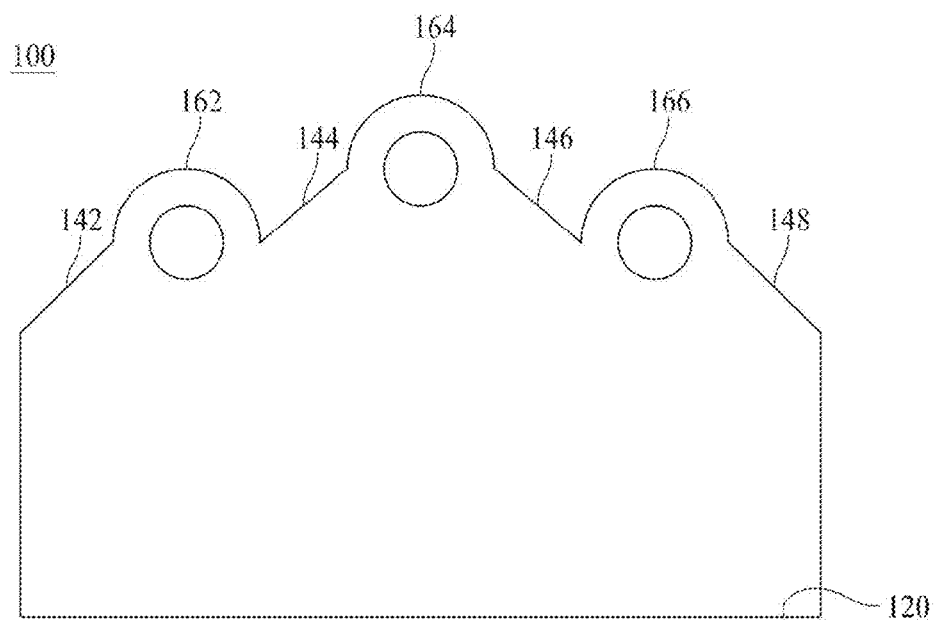
FIG. 11 is a plane view illustrating a light guide plate according to a seventh example embodiment of the present invention.

FIG. 11 is a plane view illustrating a light guide plate according to a seventh example embodiment of the present invention. In FIG. 11, the variant portion is additionally provided in the light guide plate according to the first example embodiment shown in FIGS. 2 and 3, and the structure of the half-light incident portion is modified. Therefore, only the variant portion and the half-light incident portion will be described hereinafter, and repeated description of the same elements as those of the first example embodiment will be omitted.

As illustrated in FIG. 11, the variant portion includes a first variant portion 162, a second variant portion 164, and a third variant portion 166. Further, the opposite portion includes a first half-light incident portion 142, a second half-light incident portion 144, a third half-light incident portion 146, and a fourth half-light incident portion 148. The first half-light incident portion 142 is arranged at one side of the first variant portion 162 and is formed to be inclined. The second half-light incident portion 144 is arranged between the first variant portion 162 and the second variant portion 164 and is formed to be inclined. The third half-light incident portion 146 is arranged between the second variant portion 164 and the third variant portion 166 and is formed to be inclined. The fourth half-light incident portion 148 is arranged at one side of the third variant portion 166 and is formed to be inclined.

The first, second, third, and fourth half-light incident portions 142, 144, 146, and 148 are inclined from the sides of the light guide plate 100 to the center such that the area of the light guide plate 100 becomes wide. As the opposite portion (i.e., first, second, third, and fourth half-light incident portions 142, 144, 146, and 148) is inclined from the sides of the light guide plate 100 to the light incident portion 120 such that the area of the light guide plate 100 becomes wide, light incident from the light incident portion 120 may be reflected toward the variant portions 162, 164, and 166.

Therefore, in the light guide plate 100 according to the seventh example embodiment of the present invention, the opposite portion 140 of the light incident portion is formed to be inclined, whereby the problem of the dark portion caused as light fails to reach a specific area of the light guide plate 100 may be solved. Therefore, when the light guide plate 100 is applied to the backlight unit and the liquid crystal display device, a problem that picture quality is deteriorated may be solved.

Figure 12:
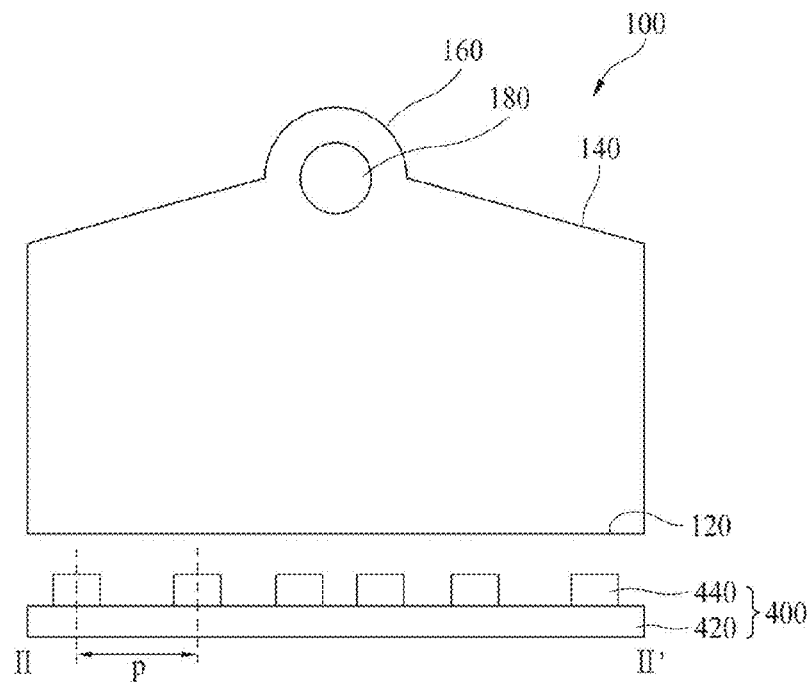
FIG. 12 is a plane view illustrating a backlight unit according to one example embodiment of the present invention.
Figure 13:
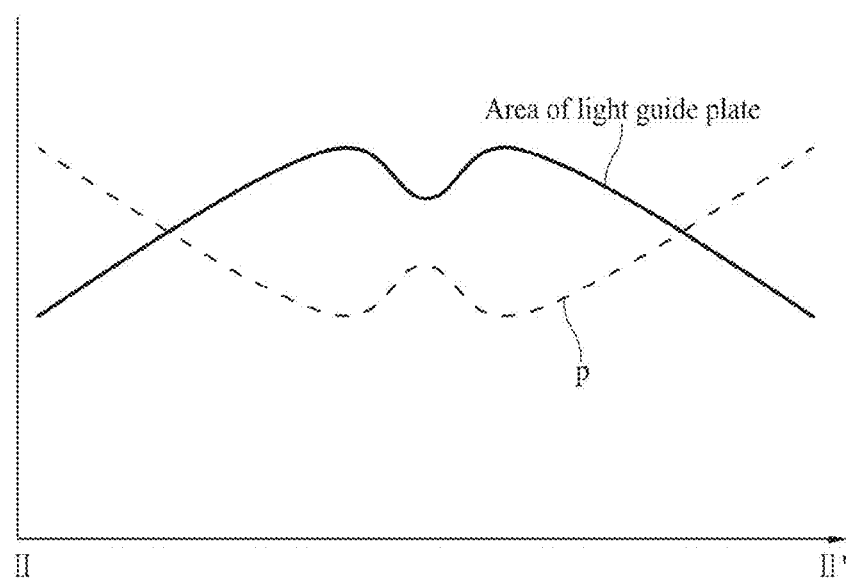
FIG. 13 is a graph illustrating a distance difference of light emitting diode packages according to an area of a light guide plate.

FIG. 12 is a plane view illustrating a backlight unit according to one example embodiment of the present invention, and FIG. 13 is a graph illustrating a distance difference of light emitting diode packages according to an area of a light guide plate. In FIGS. 12 and 13, a backlight unit is provided by additionally providing a light emitting diode array in the light incident portion of the light guide plate according to the fourth example embodiment shown in FIG. 8. Therefore, only the light emitting diode array will be described hereinafter, and repeated description of the same elements as those of the fourth example embodiment will be omitted.

As shown in FIG. 12, the light emitting diode array 400 may be arranged at one side of the light guide plate 100 to face the light incident portion 120 of the light guide plate 100. Here, the light emitting diode array 400 includes an array substrate 420 and a plurality of light emitting diode packages 440.

The array substrate 420 is arranged to face the light incident portion 120 of the light guide plate 100. At this time, the array substrate 420 may be a printed circuit board of a metal material or a flexible circuit board, which includes a driving power line (not shown) for supplying a driving power source to each of the plurality of light emitting diode packages 440, and a connector (not shown) connected to the driving power line. The array substrate 420 is connected to a backlight driving circuit through a signal cable (not shown) connected to the connector (not shown), thereby transferring a driving power source supplied from the backing driving circuit to the plurality of light emitting diode packages 440.

Each of the plurality of light emitting diode packages 440 is connected to the driving power line provided in the array substrate 420. Each of the plurality of light emitting diode packages 440 emits light in accordance with the driving power source supplied through the driving power line, thereby emitting colored light. For example, the light emitting diode package 440 may emit blue light.

At this time, in the light guide plate 100 of the backlight unit according to one example embodiment of the present invention, the opposite portion 140 is inclined such that the shape of the light guide plate 100 becomes wide. Therefore, the area of the light guide plate 100 becomes wide toward the center of the light guide plate 100, and is reduced at the center of the light guide plate 100 due to the hollow portion 180 being formed in the variant portion 160. Here, the plurality of light emitting diodes 440 have a reduced pitch 'p' with respect to their adjacent light emitting diodes 440 to allow more light to enter a wider area of the light guide plate 100 and to allow more light emitting diode packages 440 to be arranged. Particularly, the pitch 'p between the light emitting diode packages 440 facing the variant portion 160 may be reduced to allow more light to enter the introduction portions 160a and 160c of the variant portion 160. Therefore, if the area of the light guide plate 100 is increased, the pitch 'p' of the plurality of light emitting diode packages 440 is reduced. That is, the pitch 'p' between the plurality of light emitting diode packages 440 is inversely proportional to the width of the light guide plate 100. As described above, in the backlight unit according to one example embodiment of the present invention, the pitch 'p' between the plurality of light emitting diode packages 440 is varied in accordance with the area of the light guide plate 100, and the pitch 'p' between the light emitting diode packages 440 facing the variant portion 160 is reduced so that the problem of the dark portion caused by light failing to reach a specific area of the light guide plate 100 may be solved. Therefore, when the light guide plate 100 is applied to the backlight unit and the liquid crystal display device, a problem that picture quality is deteriorated may be solved.

Figure 14:
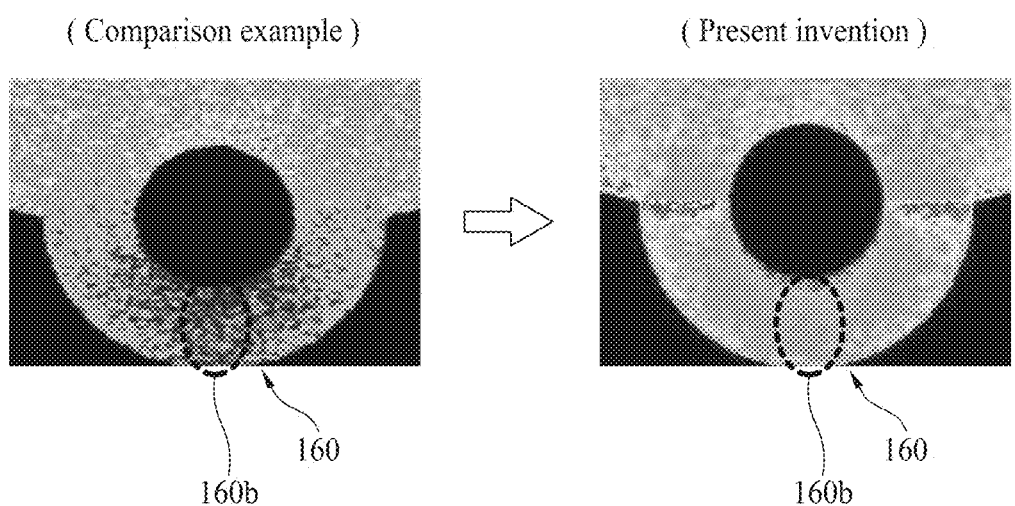
FIG. 14 illustrates the amount of light of a backlight unit according to one example embodiment of the present invention.

FIG. 14 illustrates the amount of light of a backlight unit according to one example embodiment of the present invention.

With reference to FIG. 14, in a backlight unit according to a comparison example, much light does not reach the variant portion 160 so that the variant portion 160 is displayed as a blue color. Particularly, most of light does not reach the center 160b of the variant portion 160 so that the blue color significantly occurs in the center 160b of the variant portion 160.

However, in the backlight unit according to one example embodiment of the present invention, in which the optical pattern 200 is applied to the variant portion 160 and the pitch 'p' of the plurality of light emitting diode packages 440 is varied depending on the area of the light guide plate 100, light is uniformly distributed in the variant portion 160 and thus displayed as a blue color. Thus, when the backlight unit according to one example embodiment of the present invention is applied to the liquid crystal display device, a problem that picture quality is deteriorated may be solved.

Figure 15:
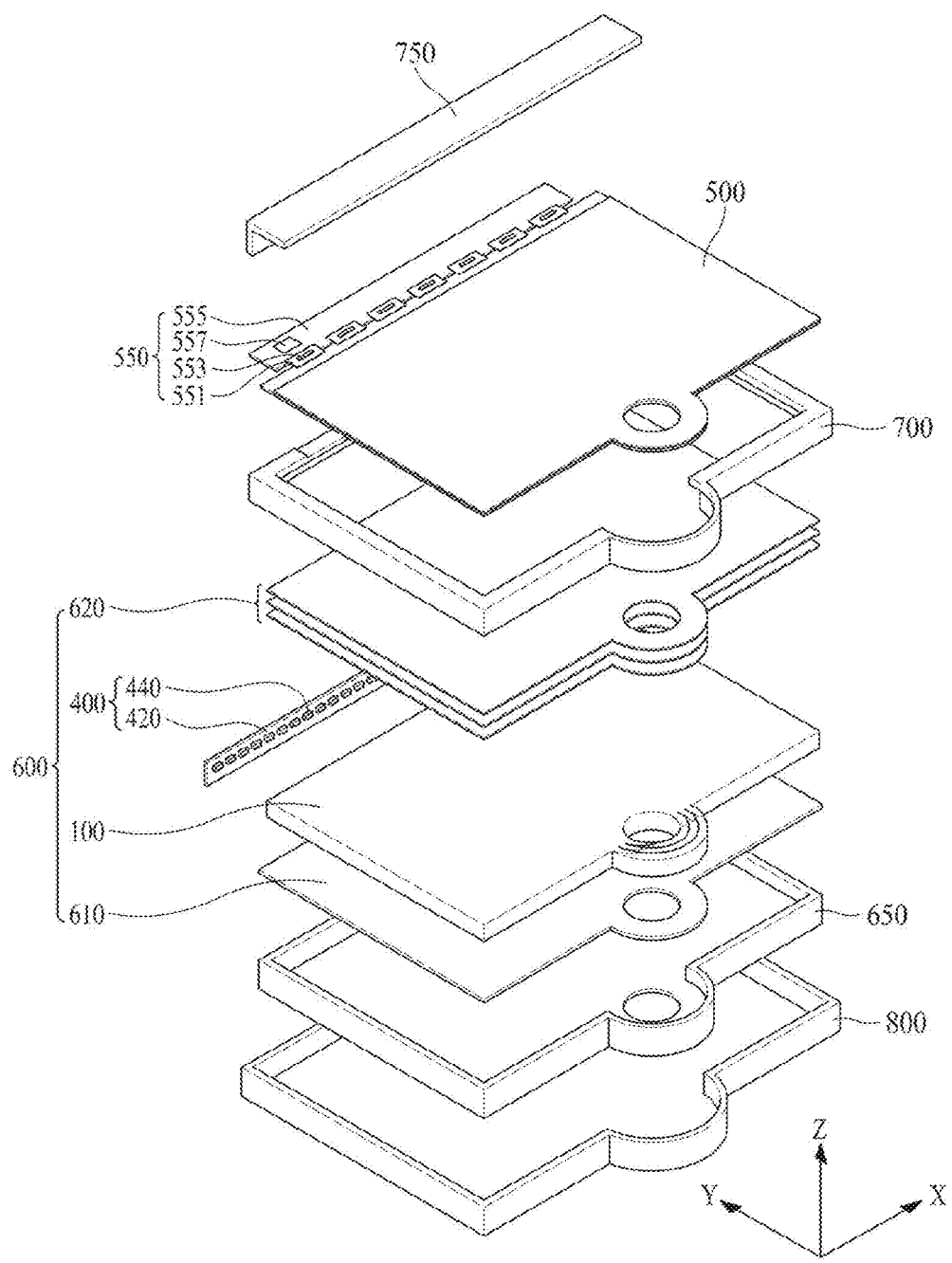
FIG. 15 is an exploded perspective view specifically illustrating a liquid crystal display device according to one example embodiment of the present invention.

FIG. 15 is an exploded perspective view specifically illustrating a liquid crystal display device according to one example embodiment of the present invention.

As shown in FIG. 15, the liquid crystal display device may include a liquid crystal panel 500, a panel driving circuit 550, a backlight unit 600, a support cover 650, a guide frame 700, a front partial cover 750, and an external case 800.

The liquid crystal panel 500 displays an image by controlling light transmittance of a liquid crystal layer (not shown). Liquid crystal panel 500 may include a lower substrate, an upper substrate, a lower polarizing member, and an upper polarizing member, wherein the lower substrate and the upper substrate are bonded to each other with the liquid crystal layer (not shown) therebetween. The liquid crystal panel 500 displays a predetermined color image in accordance with light transmittance of the liquid crystal layer by driving the liquid crystal layer in accordance with an electric field formed per pixel by data and common voltages applied to each pixel.

The panel driving circuit 550 is connected to a pad portion provided on the lower substrate, and displays a predetermined color image on the liquid crystal panel 500 by driving each pixel of the liquid crystal panel 500. The panel driving circuit 550 according to one example embodiment includes a plurality of flexible circuit films 551 connected to the pad portion of the liquid crystal panel 500, data driving integrated circuits 553 respectively packaged in the plurality of flexible circuit films 551, a display printed circuit board 555 coupled to each of the plurality of flexible circuit films 551, and a timing controller 557 packaged in the display printed circuit board 555.

Each of the flexible circuit films 551 is attached between the pad portion of the lower substrate and the printed circuit board 555 by a film attachment process. Each of the flexible circuit films 551 may be made of a tape carrier package (TCP) or a chip on flexible board or chip on film (COF). Each of the flexible circuit films 551 is bent along one side of the liquid crystal panel 500, that is, a lower side, and is arranged on a rear surface of the guide frame 700.

The data driving integrated circuits 553 are respectively packaged in the plurality of flexible circuit films 551 and thus connected to the pad portion through the flexible circuit films 551. The data driving integrated circuits 553 receive a data control signal and per-pixel data supplied from the timing controller 557, converts the per-pixel data to an analog type data signal in accordance with the data control signal, and supplies the converted data signal to a corresponding data line through the pad portion.

The display printed circuit board 555 is connected with the plurality of flexible circuit films 551. The display printed circuit board 555 serves to supply a signal that is required to display an image on each pixel to the data driving integrated circuits 553 and a gate driving circuit. To this end, various signal lines, various power circuits (not shown), and a memory device (not shown) are packaged in the display printed circuit board 555.

The timing controller 557 generates per-pixel data by aligning digital image data, which are input from a driving system in response to a timing synchronization signal packaged in the display printed circuit board 555 and supplied from an external driving system (not shown), to be suitable for a pixel arrangement structure of the liquid crystal panel 500, and provides the generated per-pixel data to the data driving integrated circuits 553. Also, the timing controller 557 controls a driving timing of each of the data driving integrated circuits 553 and the gate driving circuit by generating each of a data control signal and a gate control signal on the basis of the timing synchronization signal.

Additionally, the timing controller 557 may individually control luminance per area of the liquid crystal panel 500 by controlling the backlight unit 600 through an edge type local dimming technique.

The backlight unit 600 is received in the support cover 650 and irradiates light to a lower surface of the liquid crystal panel 500. Therefore, the liquid crystal panel 500 is arranged on the backlight unit 600. The backlight unit 600 according to one example embodiment may include a light emitting diode array 400, a light guide plate 100, a reflective sheet 610, and an optical sheet portion 620.

The light emitting diode array 400 irradiates light to a light incident portion provided at one side of the light guide plate 100. The light emitting diode array 400 according to one example embodiment may include a plurality of light emitting diode packages 440 packaged in the array substrate 420, emitting white light through a light source driving signal supplied from a backlight driving unit (not shown).

Each of the plurality of light emitting diode packages 440 is packaged in the array substrate 420 to have an interval set along the light guide plate 100 while facing the light incident portion of the light guide plate 100. The light guide plate 100 is arranged below a rear surface of the display panel 500. The light guide plates applied to FIGS. 2 to 14 may be used as the light guide plate 100 according to one example embodiment.

The reflective sheet 610 is arranged on a lower surface of the light guide plate 100 to reflect light incident from the light guide plate 100 toward the light guide plate 100, thereby minimizing loss of light advancing to a rear surface of the light guide plate 100.

The optical sheet portion 620 is arranged on the light guide plate 100, and may include, but is not limited to, a lower diffusion sheet, a prism sheet, and an upper diffusion sheet. That is, the optical sheet portion 620 may include a deposition combination of two or more selected from a diffusion sheet, a prism sheet, a dual brightness enhancement film sheet, and a lenticular sheet.

The support cover 650 receives the backlight unit 600 and also supports the guide frame 700. The guide frame 700 is supported by the support cover 650 to support the liquid crystal panel 500. At this time, one side of the guide frame 700 supports the front partial cover 750 while surrounding one side of the liquid crystal panel 500, and the other portion of the guide frame 700 except one side may be arranged below the liquid crystal panel 500.

The front partial cover 750 is coupled to the guide frame 700 to cover one side edge portion of the liquid crystal panel 500. The front partial cover 750 seals the panel driving circuit 550 connected to one side edge portion of the liquid crystal panel 500. The external case 800 forms an external appearance by surrounding the side of the guide frame 700 and the side of the front partial cover 750 while receiving the support cover 660.

As described above, in the liquid crystal display device according to one example embodiment of the present invention, the optical pattern is formed at the variant portion of the light guide plate 100 so that the problem of the dark portion caused as light fails to reach a specific area of the light guide plate 100 may be solved. Therefore, the problem that picture quality of the liquid crystal display device is deteriorated may be solved.

According to the present invention described as above, a number of advantages may be obtained. For example, according to embodiments the present invention, the optical pattern is formed at the variant portion so that the problem of the dark portion caused by light failing to reach a specific area of the light guide plate may be solved. Therefore, when the light guide plate is applied to the backlight unit and the liquid crystal display device, the problem that picture quality is deteriorated may be solved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light guide plate, comprising:
   a main body having a light receiving edge and an opposite side, the opposite side being opposite from the light receiving edge;
   at least one variant portion having a protruded portion that protrudes from the main body from the opposite side, the at least one variant portion defining a hole vertically passing through the main body; and an optical pattern provided in the at least one variant portion.

2. The light guide plate of claim 1, wherein the variant portion defines a semi-circular shape, and the hole defines a concentric circular shape within the variant portion.

3. The light guide plate of claim 1, wherein the optical pattern includes at least one optical pattern having a semi-circular shape provided between the hole and an outer side of the variant portion.

4. The light guide plate of claim 3, wherein the at least one optical pattern includes inclined surfaces provided at both edge portions arranged in a length direction of the variant portion.

5. The light guide plate of claim 1, further comprising a rear optical pattern on a rear surface, wherein the rear optical pattern has a density that increases with distance from the light incident portion.

6. The light guide plate of claim 1, wherein the opposite side includes edge segments that are disposed at sides with respect to the variant portion and inclined relative to the light receiving edge.

7. A backlight unit, comprising:
a light guide plate, the light guide plate including:
  a main body having a light receiving edge and an opposite side, the opposite side being opposite from the light receiving edge,
  at least one variant portion having a protruded portion that protrudes from the main body from the opposite side, the at least one variant portion defining a hole vertically passing through the main body, and
  an optical pattern provided in the at least one variant portion; and
a light emitting diode array arranged at a side of the light guide plate to face the light receiving edge.

8. The backlight unit of claim 7, wherein the variant portion defines a semi-circular shape, and the hole defines a concentric circular shape within the variant portion.

9. The backlight unit of claim 7, wherein the optical pattern includes at least one optical pattern having a semi-circular shape provided between the hole and an outer side of the variant portion.

10. The backlight unit of claim 9, wherein the at least one optical pattern includes inclined surfaces provided at both edge portions arranged in a length direction of the variant portion.

11. The backlight unit of claim 7, further comprising a rear optical pattern on a rear surface, wherein the rear optical pattern has a density that increases with distance from the light incident portion.

12. The backlight unit of claim 7, wherein the opposite side includes edge segments that are disposed at sides with respect to the variant portion and inclined relative to the light receiving edge.

13. The backlight unit of claim 7, wherein the light emitting diode array includes a plurality of light emitting diode packages, which have a pitch reduced as an area of the light guide plate is increased.

14. A liquid crystal display device, comprising:
a backlight unit; and
a liquid crystal panel on the backlight unit,
wherein the backlight unit includes:
  a light guide plate having a main body with a light receiving edge and an opposite side such that the opposite side being opposite from the light receiving edge, at least one variant portion having a protruded portion that protrudes from the main body from the opposite side such that the at least one variant portion defines a hole vertically passing through the main body, and an optical pattern provided in the at least one variant portion; and
  a light emitting diode array arranged at a side of the light guide plate to face the light receiving edge.

* * * * *